Figure 1:
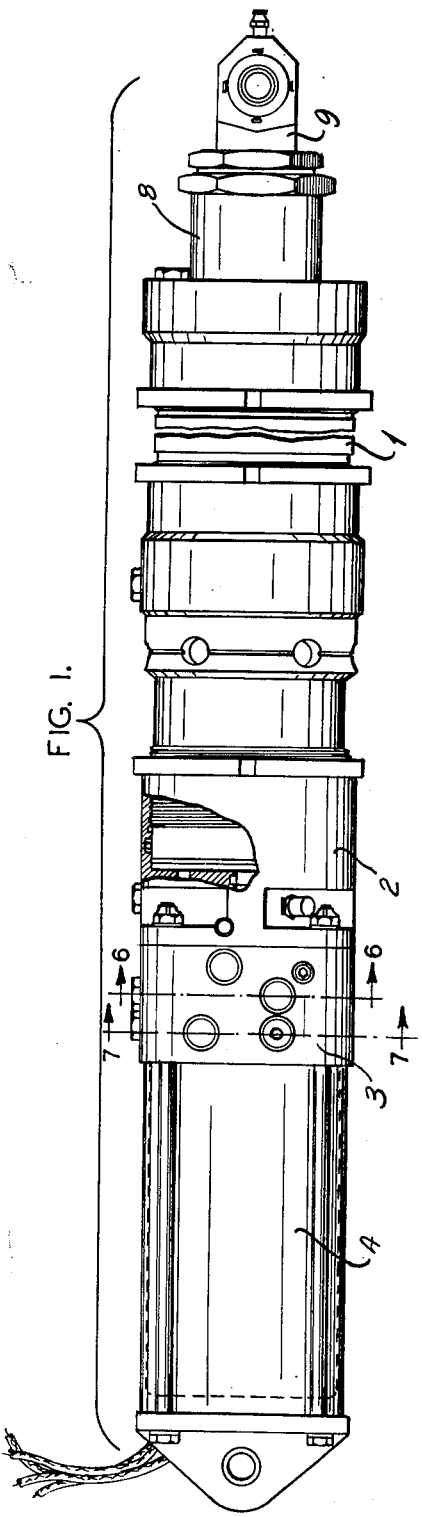

June 15, 1954　　C. H. HURKAMP ET AL　　2,680,952
ELECTRICALLY POWERED HYDRAULIC LINEAR WINGFOLD ACTUATOR
Filed Nov. 21, 1949　　6 Sheets-Sheet 1

INVENTORS:
Charles H. Hurkamp,
Ralph B. Tilney,
By Carr & Carr & Gowdy
THEIR ATTORNEYS.

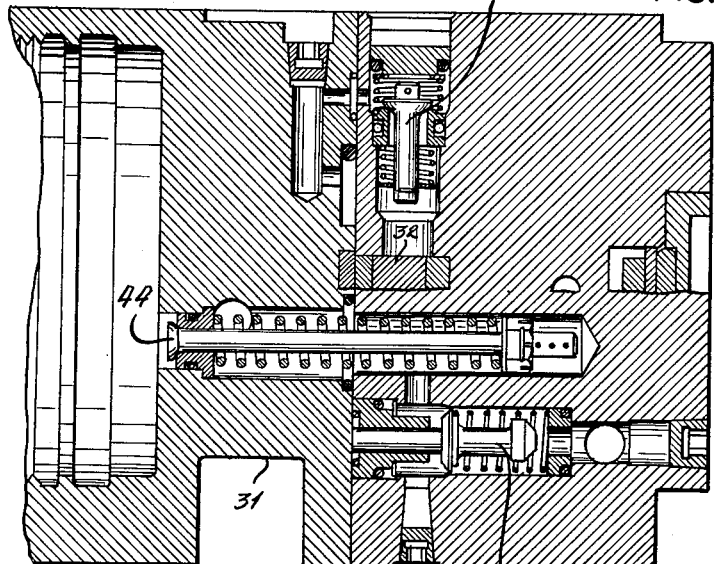
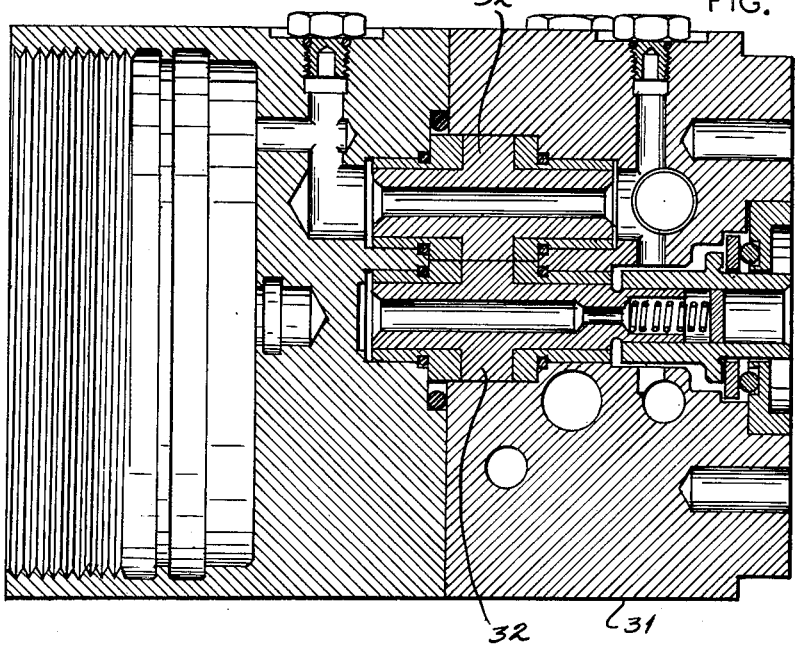

June 15, 1954  C. H. HURKAMP ET AL  2,680,952
ELECTRICALLY POWERED HYDRAULIC LINEAR WINGFOLD ACTUATOR
Filed Nov. 21, 1949  6 Sheets-Sheet 6

INVENTORS
CHARLES H. HURKAMP
RALPH B. TILNEY
BY Carr & Carr & Gravely
ATTORNEYS

Patented June 15, 1954

2,680,952

UNITED STATES PATENT OFFICE 2,680,952

ELECTRICALLY POWERED HYDRAULIC LINEAR WINGFOLD ACTUATOR

Charles H. Hurkamp, Creve Coeur, and Ralph B. Tilney, Ferguson, Mo., assignors to McDonnell Aircraft Corporation, St. Louis, Mo., a corporation of Maryland Application November 21, 1949, Serial No. 128,662

5 Claims. (Cl. 60—52)

This invention relates to improvements in mechanical devices for moving one object with respect to another, and is more particularly directed to a device for actuating the pivoted portion of the wings of aircraft.

One of the objects of the invention is to provide a linear actuator for folding the wings of aircraft and having the flexibility of a hydraulic system combined with the operational and control simplicity of an electrical system.

Another object of the invention is to provide a unitary machine for actuating the folding wings of aircraft that may be readily applied to and removed from the aircraft.

The invention consists in the provision of a reversibly driven gear pump for supplying pressure fluid to a fluid motor device in order to actuate the movable portion of the wings of aircraft, and includes a locking shuttle valve for directing the output of the pump to the proper end of the fluid motor.

The invention also consists in the provision of means in the return line from the fluid motor to the pump for restricting the flow thereto in order that sufficient fluid and pressure may be maintained on and available to the pump through the locking shuttle valves and for maintaining sufficient pressure on the complemental shuttle valve so that the pump will respond to all power requirements.

The invention further consists in the provision of pressure relief valves in connection with the pressure loading check valves so that excess fluid derived from the fluid motor will be returned to a pressure reservoir and still supply the required amount of fluid to the pump under pressure for the operation thereof. A thermal relief valve is incorporated in the pressure reservoir for compensating the volume change therein by reason of variation in temperature.

Figure 2:
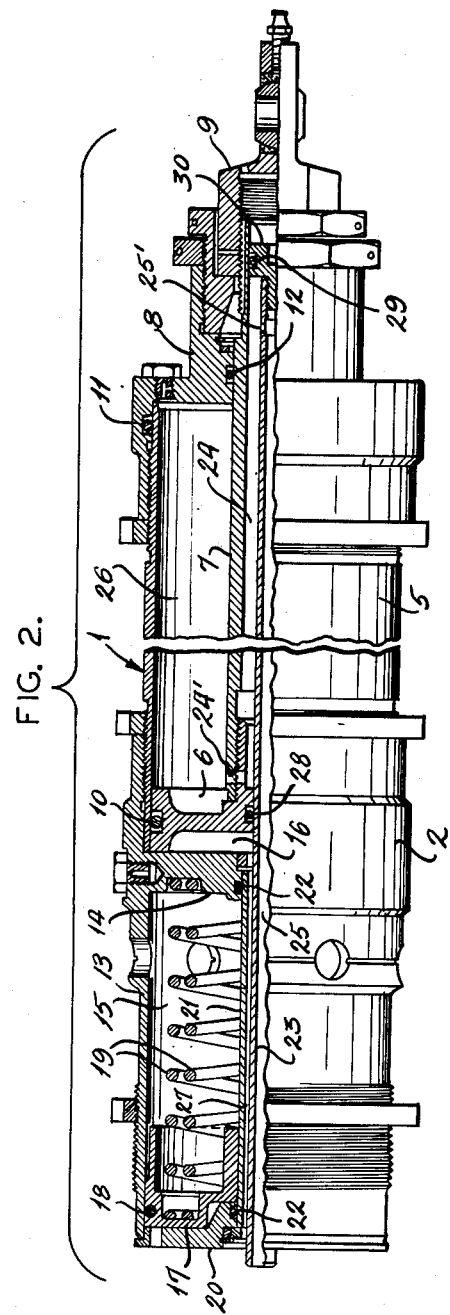
Figure 3:
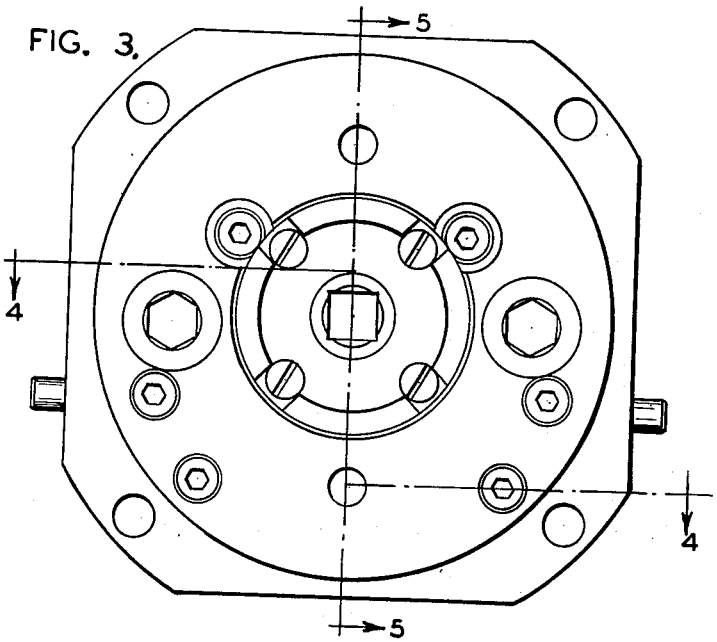
Figure 6:
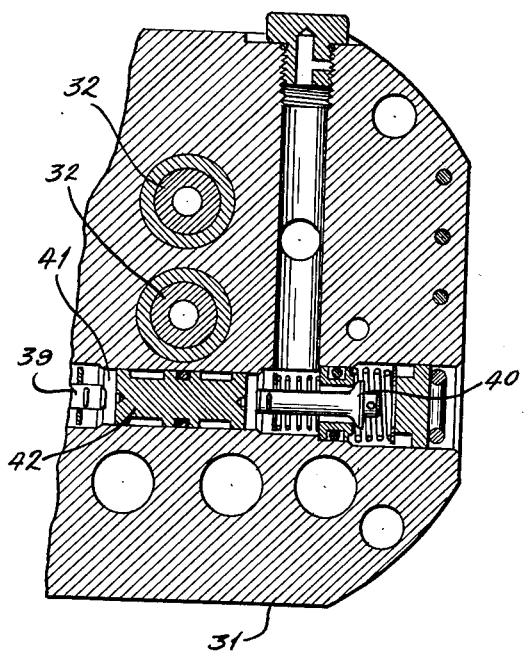
Figure 7:
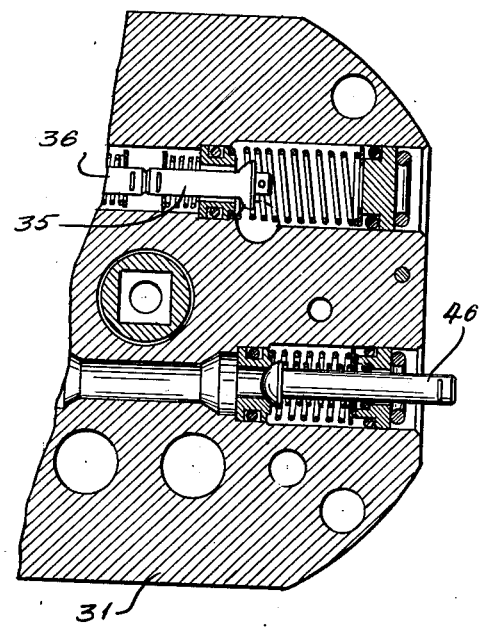
Figure 8:
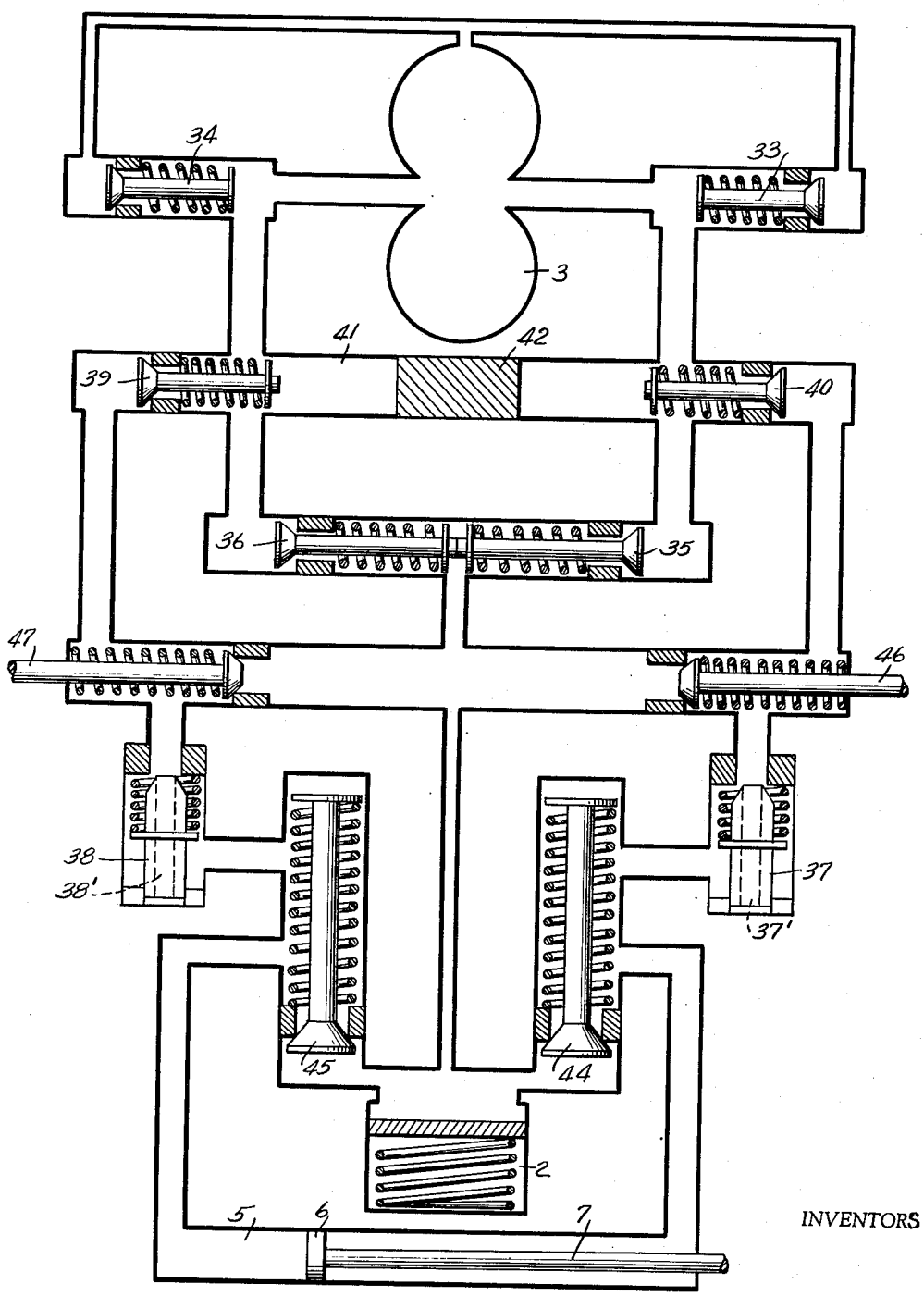
Figure 9:
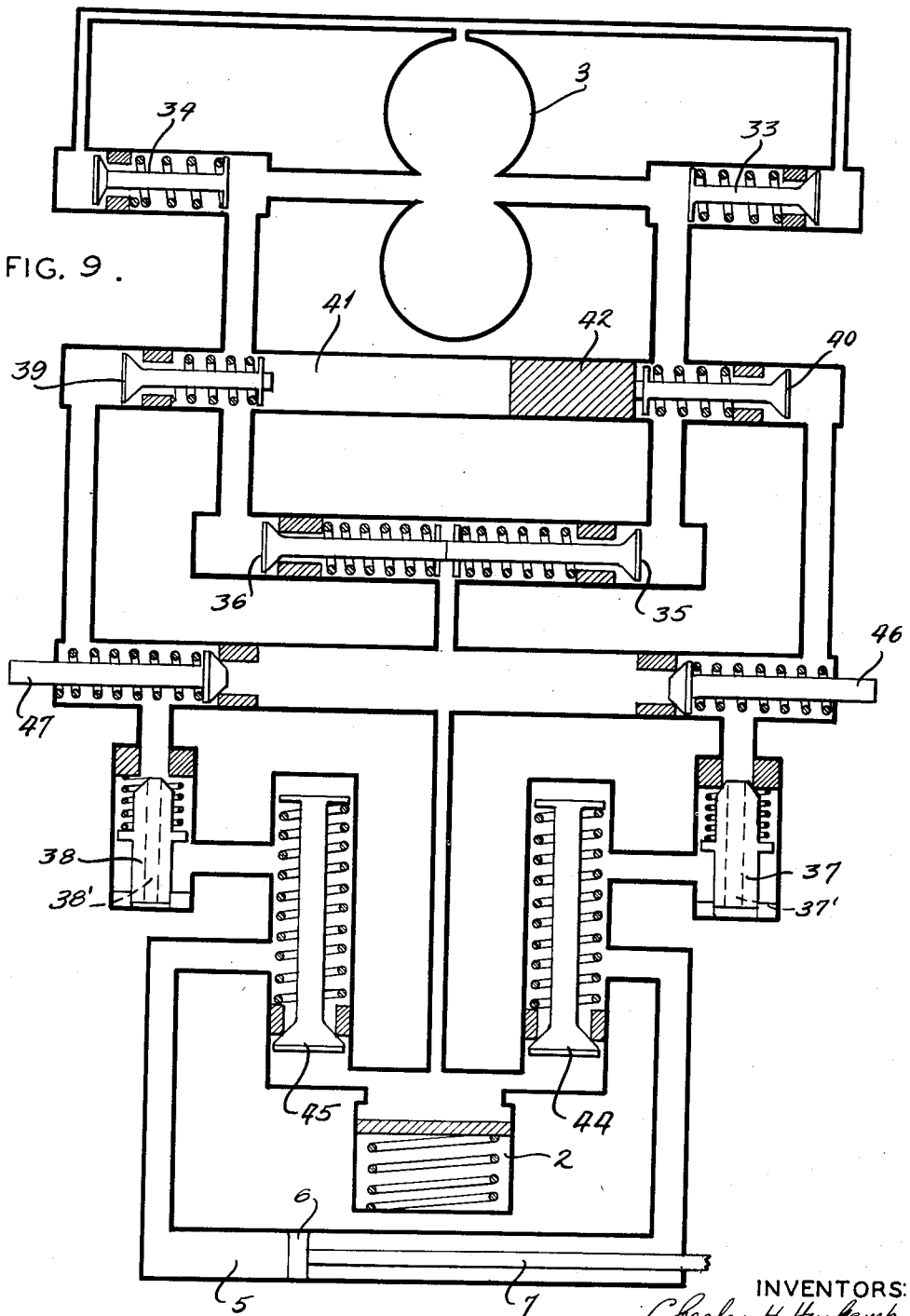
Figure 10:
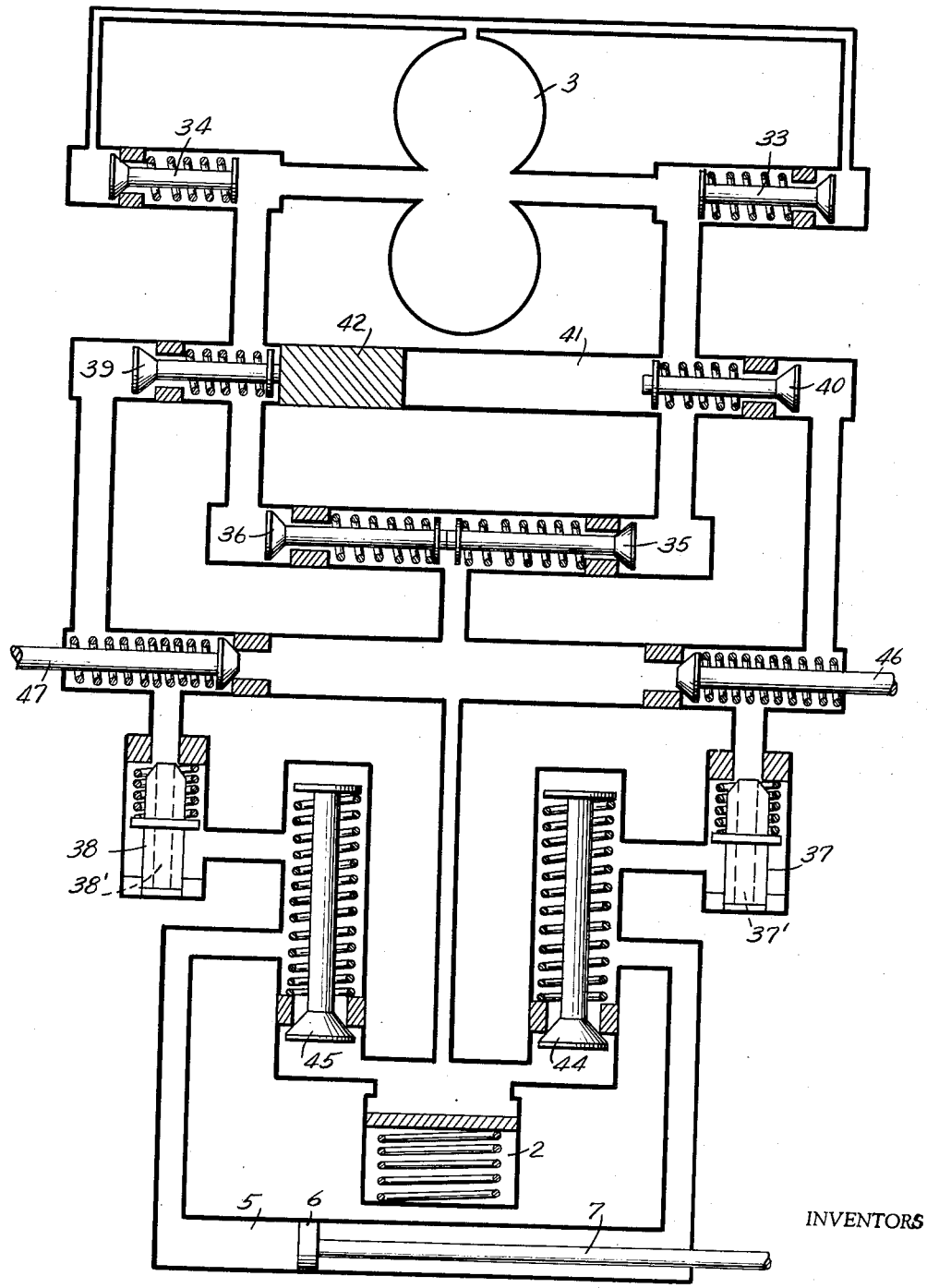

In the drawings:

Fig. 1 is an elevational view of the wingfold actuator,

Fig. 2 is an elevational view of the cylinder and the reservoir of the wingfold actuator, a portion being removed to show detail, Fig. 3 is an end view of the pump unit of the actuator, Fig. 4 is a sectional view taken on the line 4—4 of Fig. 3, Fig. 5 is a sectional view taken on the line 5—5 of Fig. 3, Fig. 6 is a sectional view taken along the line 6—6 of Fig. 1, Fig. 7 is a sectional view taken on the line 7—7 of Fig. 1, Fig. 8 is a schematic diagram of the hydraulic circuit for the wingfold actuator showing the condition of the circuit when at rest, Fig. 9 is a schematic view of the hydraulic circuit with the valves in condition for movement of the fluid motor to the right; and Fig. 10 is a view similar to Fig. 9 but showing the condition of the valves for movement of the fluid motor to the left.

The invention is incorporated in a device illustrated in Fig. 1 in which the numeral 1 designates the piston-cylinder or fluid motor part of the unit, one end of which is connectable to the aircraft wing, 2 is a pressure reservoir, 3 is a reversible gear pump, and 4 is an electric motor for driving the gear pump, one end of the motor being connectable to the frame of the aircraft.

The actuator briefly comprises a motor cylinder 5 in which a differential area piston is slidably mounted. This motor is supplied by a reversible pump 3 driven by an electric motor 4. Suitable two-way passageways concentric with the piston rod conduct fluid from opposite sides of the pump to opposite ends of the motor. A pressurized reservoir 2 is interposed between the pump and the motor cylinder wherein fluid under pressure is retained for use in the system. Each of the passageways is supplied with pressure actuated motor locking valves 39 and 40, respectively, or one for each conduit. At a point between the valves 39 and 40 and the pump, shuttle or make-up check valves 35 and 36 control suitable conduits which connect the passageways with the reservoir 2. Each of the passageways also communicates with the reservoir through other conduits at a point between the motor locking or shuttle valves and the motor, such other conduits being controlled by manually operated spring biased by-pass valves 46 and 47 seating toward the reservoir. Each passageway is also supplied with a return flow restricting valve 37 or 38 respectively arranged between the motor locking valves and the motor, and a pressure relief line leads from each of the passageways to the reservoir and is controlled by a spring biased pressure relief valve 44 or 45 opening toward the reservoir.

The fluid motor portion of the device comprises a cylinder 5 in which a differential area piston 6 is slidably mounted. A rod 7 is secured to piston 6 and projects through a closure 8 for the cylinder. The piston rod 7 has a fitting 9 threaded thereon and is adapted to be secured to one portion of the foldable wing structure of the aircraft. The piston is provided with a pressure sealing ring 10 and pressure sealing rings 11 and 12 are located between the closure 8 and cylinder 5 as well as between piston rod 7 and the closure 8.

The reservoir 2 comprises a tubular casing 13 having a wall or partition 14 therein that separates the two chambers 15 and 16. The tubular casing 13 in which chamber 15 is formed, is internally threaded to receive the threaded end of the cylinder 5, thereby making the wall or partition 14 one of the heads for the cylinder 5. The chamber 15 has a piston 17 therein provided with a pressure sealing ring 18 and a pair of springs 19 are interposed between piston 17 and the wall 14. The open end of chamber 15 has a closure 20 therein against which piston 17 abuts when there is no fluid in the reservoir. The reservoir chamber comprises the space between closure 20 and the piston 17. A tubular member 21 extending between closure 20 and partition wall 14 constitutes the remaining wall of the chamber. Pressure fluid introduced into this chamber forces piston 17 toward the right, as viewed in Fig. 2, thereby compressing springs 19 which maintain the fluid in the chamber under compression.

The tubular member 21 is disposed between closure 20 and the wall 14, there being suitable pressure sealing rings 22 provided for preventing escape of fluid from chamber 15 into chamber 16. A tubular member 23 is concentrically disposed within the tubular member 21, the partition or wall 14, piston 6, the piston rod 7 and the tubular member 21 extending from the closure 20 to closure 8, thereby providing a passageway 24 connecting with passageway 25 in tubular member 23 through port 25' and hence to and from cylinder chamber 26 through port 24'. Another passageway 27 is provided between the tubular members 21 and 23, whereby fluid is conducted to and from chamber 16. The provision of these several passageways avoids the necessity of an external conduit extending from the reservoir and pump to chambers 16 and 26, fluid flowing reversely therein, depending upon the direction of rotation of the pump. A suitable pressure sealing ring 28 is provided between the tubular member 23 and piston 6 which prevents the passage of fluid from passageway 24 into chamber 16, and vice versa. Another pressure sealing ring 29 is disposed between a closure fitting 30 of tube 23 and piston rod 7 which prevents passage of fluid from passageway 24 into fitting 9.

The pump 3 comprises a housing 31 in which a pair of gears 32 are mounted on suitable spindles, one of which is driven by the motor 4. The pump is reversible and for this reason two sets of control valves are incorporated into the pump. The pump discharge is applied selectively to shuttle or make up valves 35 and 36 (Fig. 7) so that one of the valves is closed and the other is open, depending upon the direction of rotation of the pump. The stems of the valves engage each other in end-to-end relation so that the aforementioned positions are maintained. After passing the open motor locking valve 39 or 40, the pump discharge flows past one of the balanced flow restrictor valves 37 or 38 (Fig. 4) which valves are not effective on the high pressure side of the pump but are effective on the low pressure side. After passing the flow restrictor valve 37, assuming the pump is rotating to establish this flow, pressure fluid is admitted into one end, the right end as viewed in Fig. 10, of cylinder 5 for moving the piston 6 therein for actuating the folding portion of the wing, or any other member to be moved with respect to a fixed member.

The fluid in the opposite end of the cylinder under the foregoing condition is forced therefrom and flows past the flow restrictor valve 38 after which the fluid returns to the intake side of the pump past the open motor locking valve 39. The flow restrictor valve 38 permits operation of the hydraulic system even though there may be an assisting load on the piston rod 7. Should valve 38 seat, its passage 38' would be open to restricted flow. Similarly, when reverse flow is set up, passage 37' is available in valve 37.

Compensation for the piston rod 7 in cylinder 5 is made by fluid passing to and from reservoir 2 through shuttle or make up valve 35. Pressure relief valves 44 and 45 (Fig. 4) are connected to the ends of the cylinder for by-passing fluid to reservoir 2 in the event excess pressure is developed in the system. Manual spring biased bypass valves 46 and 47 (Fig. 7) are provided in order that fluid may be by-passed from either end of the cylinder to the reservoir, thereby unlocking the motor and making it possible to manually move the cylinder, this action being desirable and necessary when there is a failure in pump 3 or its driving motor 4. The connections between the several valves are shown as conduits in Fig. 8 but are actually bores or passageways in the housing 31. The flow restrictor valve is designed for restricting fluid flow to a volume less than the near zero pressure output of the pump, thus maintaining a pressure sufficient to keep the motor locking check valve 39 operative and for holding its complemental motor locking check valve 40 open. These valves assure a fluid supply to the pump and a holding of pressure thereby under all operative conditions.

Figs. 8, 9 and 10 show the organization and condition of the several valves with respect to the pump 3 and the operation of the control valves and their relationship to reservoir 2 as well as to motor 1 for a full cycle of operation. The particular circuit and valve arrangement provides a smooth and uniform operation of the motor 1, avoiding the unstable operation that characterizes devices not incorporating restrictor valves. Since the passageways connecting the pump to both ends of the cylinder, for reverse operation of the motor, are contained within the assembly, a compact and highly efficient operating unit is provided for the wing actuator.

Fig. 8 illustrates the system and the position of the valves therein when the pump 3 is not operating. Thus, valves 39 and 40 are spring urged into closed position and the piston member 42 in conduit 41 is stationary. Shuttle valves 35 and 36 are in half open position, being held by the springs in this condition. Relief valves 44 and 45, and manual by-pass valves 46 and 47 are each in closed position under the action of their respective spring means. Also the flow restricting valves 37 and 38 are held in open position.

Fig. 9 shows the condition of the several valves in the system when the pump 3 is rotating to extend the piston rod 7 to the right. Pressure fluid from the pump now opens valve 39 and displaces piston member 42 to the right to also open return valve 40 to permit fluid return to the suction side of the pump. Shuttle valve 36 is moved to closed position which opens its complementary shuttle valve 35 to open the make-up conduit for reservoir 2. Since valve 47 remains closed, the pressure fluid passes through the relief valve 45 to the left side of piston 6 in cylinder 5. Fluid displaced from the right side of piston 6 now is forced to flow through relief valve 44 and restrictor valve 37 to the open return valve 40 and the pump. If the pump delivers excess fluid, valve 45 opens to relieve the pressure and the fluid is absorbed in the reservoir 2 by receding movement of the piston 17 (Fig. 2). This last function, while automatic as to valve 45, may also be manually effected upon opening the by-pass valve 47.

Fig. 10 illustrates the system function for reverse operation of pump 3 to retract the piston rod 7, or move it to the left. At this time valve 40 acts as a delivery valve, valve 39 as the suction valve, and member 42 is forced to the left to open valve 39. Shuttle valve 35 now closes to open shuttle valve 36. The pressure fluid is delivered to the right side of the piston 6 and the return flow passes valves 45, 38, 47 and open valve 39. It should be obvious that the valves in the system are now reversed from the condition described in connection with Fig. 9.

The valves 33 and 34 form no part of the present invention, but are a part of the pump 3 and perform a special function for such pump which it is not necessary to explain as the invention is not affected thereby.

There is linear action in this device without torque which produces a more uniform motion of the movable portion of the wing with respect to the stationary portion. The device has relatively low starting and stopping inertia so that the starting and stopping of the wingfold actuator will require but little power, thus avoiding jerking of the actuated portion of the wing. Because of the low inertia of starting and stopping, action of the device can be "damped" simply and easily, thereby enabling positive positioning of the wing and adjustment to within very close tolerances for protecting the device from overload. The differential area of the two sides of piston 6 is compensated by the novel hydraulic circuit disclosed and is applicable for externally applied loads as well as for use in connection with the folding of the wings of aircraft.

What we claim is:

1. A folding wing actuator comprising a motor cylinder, a piston slidably mounted in said cylinder, a head for said cylinder, a hollow rod for said piston extending through said head, a casing secured to said cylinder and having a partition therein forming a second head for said cylinder, a piston in said casing, a closure for said casing, a tube connected between said closure and partition for defining a reservoir, a spring acting on the piston in said casing to pressurize fluid therein, a pump connected to said casing, a motor connected to said pump for driving same, means for establishing communication between opposite sides of said pump and opposite sides of the piston in said cylinder including a conduit connected between said pump and said head, said conduit in combination with said tube and hollow piston rod creating two passageways for transmitting fluid for reversibly actuating said piston in said cylinder, a pair of selectively operable motor locking valves in said pump for controlling said motor, a pair of selectively operable make-up valves in said pump for connecting said passageways to said reservoir, a pair of selectively operable restrictor valves in said pump opening toward said motor for controlling fluid flow away from the motor cylinder and piston; and a pair of pressure relief valves in said pump for controlling the discharge from said passageways to said reservoir.

2. A folding wing actuator comprising a casing, a motor cylinder secured to said casing, a partition in said casing forming a head for the cylinder, a second head for said cylinder, a piston slidably mounted in said cylinder, a hollow rod for said piston extending through said second head, a piston in said casing, a closure for said casing, a tube connected between said casing closure and said partition thereby defining a reservoir between the piston and closure, a spring acting on said casing piston for placing fluid in the reservoir under pressure, a pump secured to said casing, means for conducting fluid toward and away from said pump which includes a conduit extending through said pistons and partition wall concentric with said tube and hollow piston rod thereby forming two passageways connected between opposite sides of said pump and the piston in said cylinder, a pair of selectively operable motor locking valves in said pump connected in said passageways, a pair of selectively operable make-up valves in said pump and connecting said passageways with said reservoir; and a pair of selectively operable flow restrictor valves in said pump and included in the discharge passageways of said motor, a pair of by-pass valves in said pump opening toward said reservoir.

3. A folding wing actuator comprising a casing, a motor cylinder secured to said casing, a partition in said casing forming one head for the cylinder, a second head for said cylinder, a piston slidably mounted in said cylinder, a hollow rod for said piston extending through said second head, a piston in said casing, a closure for said casing, a tube connected between said casing closure and said partition thereby defining a reservoir, a pump secured to said casing, means for conducting fluid toward and away from said pump which includes a conduit extending through said pistons and partition wall concentric with said tube and hollow piston rod thereby forming two passageways connected between opposite sides of said pump and motor cylinder piston, a pair of selectively operable motor locking valves in said pump and connected in said passageways, a pair of selectively operable make-up valves in said pump and connecting said passageways with said reservoir, a pair of selectively operable manual by-pass valves in said pump and connecting said passageways with said reservoir, a pair of selectively operable restrictor valves in said pump and connected in the discharge passageways from said motor; and a spring acting on said casing piston to place fluid in said reservoir under pressure.

4. A folding wing actuator comprising a casing, a motor cylinder secured to said casing, a partition in said casing forming a head for the cylinder, a second head for said cylinder, a piston slidably mounted in said cylinder, a hollow rod for said piston extending through said second head, a piston in said casing, a closure for said casing, a tube connected between said casing closure and said partition thereby defining a reservoir, a pump secured to said casing, means for conducting fluid toward and away from said pump which includes a conduit extending through said pistons and partition wall concentric with said tube and hollow piston rod thereby forming two passageways connected between opposite sides of said pump and motor cylinder and piston, a pair of selectively operable motor locking valves in said pump, there being one valve in each passageway, a pair of selectively operable make-up valves in said pump, there being one valve connecting each passageway with said reservoir, a pair of selectively operable restrictor valves in said pump, there being one valve for each discharge passageway from said motor cylinder and opening toward said motor; and a spring acting on said casing piston to place fluid in said reservoir under pressure.

5. A folding wing actuator comprising a casing, a motor cylinder secured to said casing, a partition in said casing forming a head for the cylinder, a second head for said cylinder, a piston slidably mounted in said cylinder, a hollow rod for said piston extending through said second head, a piston in said casing, a closure for said casing, a tube connected between said casing closure and said partition thereby defining a reservoir, a pump secured to said casing, means for conducting fluid toward and away from said pump which includes a conduit extending through said pistons and partition wall concentric with said tube and hollow piston rod thereby forming two passageways connected between opposite sides of said pump and piston, a pair of selectively operable motor lock valves, one in each passageway, a pair of selectively operable make-up valves, one connecting each passageway with said reservoir, a pair of manually operable by-pass valves opening toward said reservoir, one valve in each passageway, a pair of restrictor valves opening toward said motor, there being a valve in each passageway, a pressure relief valve in each passageway opening toward and into said reservoir; and a spring acting on said casing piston to apply pressure to reservoir fluid.

References Cited in the file of this patent

UNITED STATES PATENTS

| Number | Name | Date |
| --- | --- | --- |
| 577,489 | Mills | Feb. 23, 1897 |
| 1,725,489 | Stratton | Aug. 20, 1929 |
| 1,861,116 | Ernst | May 31, 1932 |
| 2,223,792 | Muir | Dec. 3, 1940 |
| 2,457,467 | Hartman | Dec. 28, 1948 |
| 2,467,509 | Trautman | Apr. 19, 1949 |